Patented Apr. 17, 1945

2,373,982

UNITED STATES PATENT OFFICE 2,373,982

PRODUCTION OF STYRENES AND OTHER PRODUCTS

Murray Gray Sturrock and Thomas Lawe, Montreal, Quebec, Canada, assignors to Dominion Tar & Chemical Company Limited, Montreal, Quebec, Canada No Drawing. Application April 24, 1940, Serial No. 331,382

20 Claims. (Cl. 260—669)

This invention relates to the production of styrenes and other products by simple molecular decomposition of asymmetric diaryl substituted paraffins and particularly by a convenient and economical method of treating benzol still residues.

Benzol still residues produced in large quantities during the distillation of light oils which are produced along with gas in coke oven and gas works operation, are at present used mainly as fuels, although they contain potentially much more valuable products. In normal practice unsaturated materials are removed by washing the light oils with concentrated sulphuric acid prior to the final distillation. The polymerizable materials are rendered non-volatile and remain in the residue from the distillation of the light oils.

An object of the present invention is to provide a method for the production of styrenes, colorless liquids, which can be readily converted into hard colorless resins with attractive industrial and commercial uses, toluene, substantially pure xylene, and the like from these residues.

Another object of the invention is to produce styrenes by a method which avoids the loss of hydrogen, which breaks down the raw material into products which are readily separable from themselves and from the unchanged raw material, and which may be continuous in operation and cyclic in relation to unchanged raw material.

Broadly the invention contemplates a convenient and economical method for the conversion of 1:1 diaryl substituted paraffins or their nuclear substituted derivatives having at least two carbon atoms in the paraffin chain, into two mononuclear aromatic compounds one of which contains the paraffin chain as an unsaturated vinyl side chain.

In accordance with the invention diaryl substituted paraffins having at least two carbon atoms in the paraffin chain are converted into two mononuclear aromatic compounds one of which contains the paraffin chain as an unsaturated vinyl side chain by heating the material in the presence of a catalyst at a temperature to effect simple molecular decomposition, and the mononuclear products are separated by fractionation.

The diaryl substituted paraffin, or hydrocarbon oils containing it such as are produced by the distillation of benzol still residues, are passed through a steel or other suitable tube filled with balls or particles of a catalyst, which promotes simple molecular decomposition, and heated to a temperature to convert the material without loss of hydrogen. Catalysts which are effective are activated siliceous materials and of these the hydrated aluminum silicates are preferred.

Temperatures ranging between 350° and 500° C. are generally suitable and in some cases the preferred temperature is substantially 350° C. at normal pressures. Diluents such as water vapour may be used. The mononuclear compounds which are produced during the reaction may be separated from the product by fractionation and the unchanged portion may then be returned for retreatment.

The following are illustrative of the raw materials which may be subjected to the treatment of the invention: asymmetric diphenyl ethane, asymmetric phenyl tolyl ethane, asymmetric ditolyl ethane, asymmetric phenyl xylyl ethane, asymmetric tolyl xylyl ethane, asymmetric dixylyl ethane, alpha alpha diphenyl propane, alpha alpha phenyl tolyl propane, alpha alpha phenyl xylyl propane, alpha alpha ditolyl propane, alpha alpha tolyl xylyl propane, and the like, and their nuclearly substituted halogen, hydroxyl, and like derivatives which are volatile at the temperature and pressure used in the degradation.

The following are examples, in which a tube having an inside diameter of 4.1 cm was employed, of the use of the method:

(1) Using 800 grams of catalyst heated at 350° C. and 200 grams of p-p ditolyl ethane together with an equal volume of water at the rate of 180 grams of ditolyl ethane per hour through the tube, there was obtained 190 grams of condensed oil product which consisted of 76 grams of light oil boiling below 200° C., 108 grams of unchanged ditolyl ethane and 6 grams of a higher boiling residue. Fractionation of the light oil gave 38 grams of para methyl styrene and a similar quantity of toluene. By recirculating the unchanged ditolyl ethane through the tube and separating and combining the light oil products there was obtained after three passages through the tube 150 grams of light oil, 25 grams of unchanged ditolyl ethane and 12 grams of a high boiling oil with a loss of 13 grams due to carbon, gas and mechanical losses. On fractionation the 150 grams of light oil gave 75 grams of crude para methyl styrene and a similar quantity of toluene.

(2) Using 800 grams of catalyst heated at 400–425° C. and passing 115 grams of pure alpha alpha diphenyl propane together with an equal volume of water at the rate of 175 grams of diphenyl propane per hour, there was obtained 64 grams of light oil boiling below 200° C., 35 grams of unchanged diphenyl propane, 7 grams of high boiling residue and 9 grams of loss due to carbon, gas and mechanical loss. On fractionation the light oil gave 32 grams of benzene and a similar quantity of a crude methyl styrene in which the methyl group was substituted in the side chain.

It has been found that when benzol still residues are redistilled about 50% of the charge distills up to a vapour temperature of about 260° C. and the balance of the charge which boils between 260° C. and about 350° C. is composed mainly of phenyl aryl ethanes, addition compounds formed by the union of styrene with toluene, xylenes, etc. in the acid washing operation. Phenyl para xylyl ethane is present in greater amount than the other possible compounds in the phenyl aryl ethane content of the residue. This latter fraction may be more closely cut and used in the present method as follows:

(3) Using 200 grams of catalyst at 375° C. and passing 150 grams of the benzol still residue fraction boiling at 285 to 295° C., containing asymmetric phenyl tolyl ethane together with an equal volume of water at a rate of flow of 40 grams of oil per hour there was obtained 147 grams of condensed oil product which consisted of 39 grams of light oil boiling below 200° C., 104 grams of unchanged fraction and 4 grams of high boiling residue. By repassing the unchanged fraction and separating and combining the light oil product in the above manner there was obtained after 4 passes 87 grams of light oil boiling below 200° C., 41 grams of unchanged fraction, 14 grams of high boiling residue and 8 grams of mechanical handling loss, carbon and gas. The yield of light oil on the basis of the amount of the fraction actually consumed is 80.0%. The light oil was found to be a 50% mixture of toluene and crude styrene which are separated by fractionation. Synthetic phenyl tolyl ethane gives similar results.

(4) Using 200 grams of catalyst at 350° C. and passing 150 grams of the benzol still residue fraction boiling at 295 to 305° C. containing asymmetric phenyl xylyl ethane together with an equal volume of water at a rate of flow of 40 grams of oil per hour, there was obtained 146 grams of condensed oil product which consisted of 53 grams of light oil boiling below 200° C., 83 grams of unchanged fraction and 5.5 grams of high boiling residue. By repassing the unchanged fraction in the above manner and separating and combining the light oil product there was obtained after 4 passes 100 grams of light oil, 18 grams of unchanged fraction, 11 grams of high boiling residue and 21 grams mechanical handling loss, carbon and gas. The yield of light oil, on the basis of the amount of fraction actually consumed, is 75.7%. The light oil was found to be a mixture of crude styrene and xylene. Synthetic phenyl xylyl ethane was found to behave similarly.

As indicated kaolin or pure hydrated aluminum silicates are the preferred catalysts. The used catalyst is activated by passing air over it at a temperature of preferably not less than 500° C. to burn off carbon or other deposit formed thereon during use. It should be so treated after each use to insure best results. This treatment of the catalyst forms one step in the cyclic method.

The economic and practical advantages of the invention will be apparent. Synthetic diaryl ethanes may be prepared from cheap and readily available materials, such as acetylene together with benzene, toluene, xylene, etc. Its application to benzol still residues converts a low grade product, which is frequently a nuisance, into products of substantial value.

We claim:

1. A method of producing styrenes and the like which comprises heating one of a class of compounds consisting of asymmetric diaryl substituted paraffins in which both aryl groups are attached to the same carbon atom and their nuclear substituted derivatives having at least two carbon atoms in the paraffin chain in the presence of a catalyst at a temperature in excess of 300° C. and sufficient to convert the material by simple molecular decomposition into two mononuclear aromatic compounds, one of which contains the paraffin chain as an unsaturated vinyl side chain.

2. In a method of producing mononuclear aromatic compounds, the step which comprises heating one of a class of compounds consisting of asymmetric diaryl substituted paraffins in which both aryl groups are attached to the same carbon atom and their nuclear substituted derivatives having at least two carbon atoms in the paraffin chain at a temperature between 350–500° C. in the presence of a catalyst which promotes simple molecular decomposition.

3. A method of producing styrenes and the like which comprises heating vapours of one of a class of compounds consisting of asymmetric diaryl substituted paraffins in which both aryl groups are attached to the same carbon atom and their nuclear substituted derivatives having at least two carbon atoms in the paraffin chain in the presence of a siliceous catalyst which promotes simple molecular decomposition at a temperature of substantially 350° C., condensing the product and separating the styrene therefrom by fractionation.

4. A method of producing useful products from asymmetric diaryl substituted paraffins in which both aryl groups are attached to the same carbon atom and their nuclear substituted derivatives having at least two carbon atoms in the paraffin chain which comprises passing one of such compounds in contact with a siliceous catalyst which promotes simple molecular decomposition at a temperature of 350–500° C. to convert the compound into two mononuclear aromatic compounds and separating the latter.

5. In the recovery of useful products from benzol still residues, the method which comprises passing a distillate fraction of the portion of said residues which boils at a temperature between 260 and 350° C. in contact with a catalyst, which promotes simple molecular decomposition, heated to 350–500° C. to form a light oil product containing two mononuclear aromatic hydrocarbons and separating these compounds.

6. A method as set forth in claim 5 wherein the undecomposed portion of the said fraction is separated from the product and recirculated in contact with the heated catalyst.

7. In the recovery of useful products from benzol still residues, the method which comprises fractionating the distillate of said residues to provide a fraction boiling between 260 and 350° C. and containing a substantial proportion of phenyl aryl ethanes, and heating said fraction in the presence of a siliceous catalyst which promotes simple molecular decomposition at a temperature to convert said ethanes by simple molecular decomposition into two mononuclear hydrocarbons.

8. A method as set forth in claim 7 wherein a portion of said fraction boiling between 285 and 295° C. is heated in the presence of said catalyst at a temperature between 350 and 500° C. to provide a light oil consisting of substantially equal proportions of toluene and styrene, and separating the styrene from the toluene.

9. A method as set forth in claim 7 wherein a portion of said fraction containing a substantial proportion of asymmetric phenyl xylyl ethane is heated in the presence of said catalyst at a temperature between 350 and 500° C. to provide a light oil consisting of substantially equal proportions of styrene and xylene.

10. A method as set forth in claim 4 wherein the undecomposed portion of said compound is recirculated in contact with said heated catalyst to increase the yield of said mononuclear aromatic compounds.

11. A method of producing toluene, styrene, xylene and like mononuclear hydrocarbons which comprises heating asymmetric phenyl aryl ethane in the presence of a siliceous catalyst which promotes simple molecular decomposition at a temperature between 350 to 500° C. to convert said ethane by simple molecular decomposition into two mononuclear compounds, and recovering each of said compounds as a commercial product.

12. A cyclic method of producing mononuclear aromatic compounds which comprises heating one of the asymmetric diaryl paraffins in which both aryl groups are attached to the same carbon atom and their nuclear substituted derivatives having at least two carbon atoms in the paraffin chain, at a temperature between 350 and 500° C. in the presence of a catalyst, which promotes simple molecular decomposition, to form two mononuclear aromatic compounds, separating the unchanged portion of said substance from the product and recirculating it in contact with the heated catalyst.

13. In a method of producing mononuclear aromatic compounds, a step which comprises heating one of a class of compounds consisting of asymmetric diaryl substituted paraffins and their nuclear substituted derivatives, having at least two carbon atoms in the paraffin chain, at a temperature of at least 350° C. in the presence of a siliceous catalyst which promotes simple molecular decomposition.

14. In a method of producing mononuclear aromatic compounds, a step which comprises heating one of a class of compounds consisting of asymmetric diaryl substituted paraffins and their nuclear substituted derivatives, having at least two carbon atoms in the paraffin chain, at a temperature of at least 350° C. in the presence of a catalyst which promotes simple molecular decomposition and which is a hydrated aluminum silicate.

15. In a method of producing styrene, a step which comprises heating an asymmetric diaryl ethane, wherein at least one aryl group is a phenyl group, at a temperature of at least 350° C. in the presence of a hydrated aluminum silicate catalyst which promotes simple molecular decomposition into two mononuclear aromatic compounds.

16. In a method of producing mononuclear aromatic compounds, including a styrene, methyl substituted in the side chain, a step which comprises heating an asymmetric diaryl propane, at a temperature of at least 350° C. in the presence of a hydrated aluminum silicate catalyst which promotes simple molecular decomposition into two mononuclear aromatic compounds.

17. In a method of producing mononuclear aromatic compounds including styrene, methyl substituted in the side chain, a step which comprises heating an asymmetric diaryl propane, wherein at least one aryl group is a phenyl group, in the presence of a hydrated aluminum silicate catalyst, which promotes simple molecular decomposition into two mononuclear aromatic compounds, at a temperature of at least 350° C.

18. In a method of producing mononuclear aromatic compounds, including a styrene having at least one methyl group substituted in the nucleus, the step which comprises heating an asymmetric diaryl ethane, each of the aryl groups of which is substituted with at least one methyl group, at a temperature of at least 350° C. in the presence of a hydrated aluminum silicate catalyst which promotes simple molecular decomposition into two mononuclear aromatic compounds.

19. In a method of producing mononuclear aromatic compounds, a step which comprises heating an asymmetric diaryl ethane, one aryl group of which has a single methyl group substituted in the nucleus, the other aryl group of which has at least one methyl group substituted in the nucleus, at a temperature of at least 350° C. in the presence of a hydrated aluminum silicate catalyst which promotes simple molecular decomposition into two mononuclear aromatic compounds.

20. In a method of producing mononuclear aromatic compounds, the step set forth in claim 2 wherein the catalyst is a hydrated aluminum silicate.

M. G. STURROCK.
THOS. LAWE.